Figure 4:
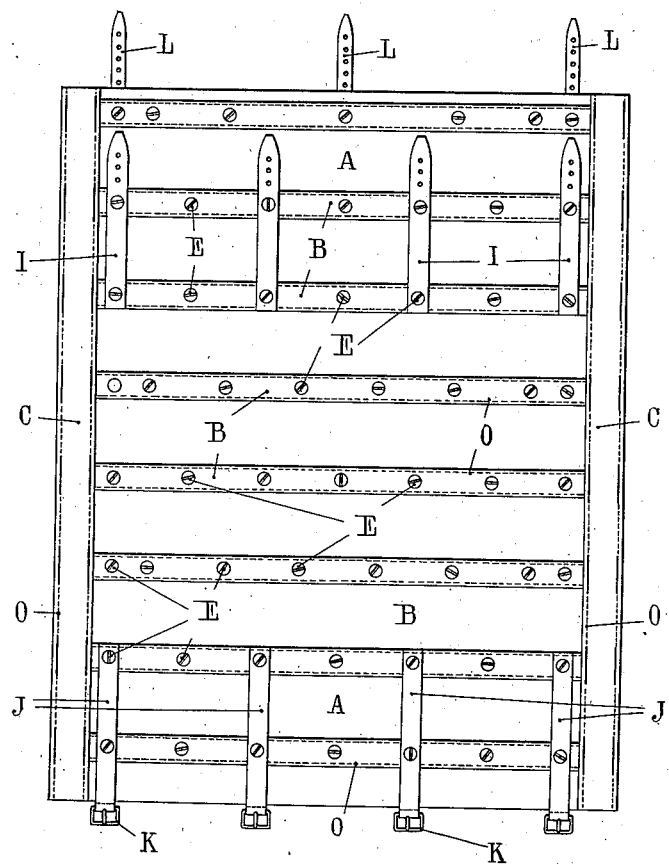

A. B. J. R. MIRANDE.
APRON FOR HARVESTING MACHINES.
APPLICATION FILED JUNE 7, 1913.
1,138,235.
Patented May 4, 1915.
2 SHEETS—SHEET 1.
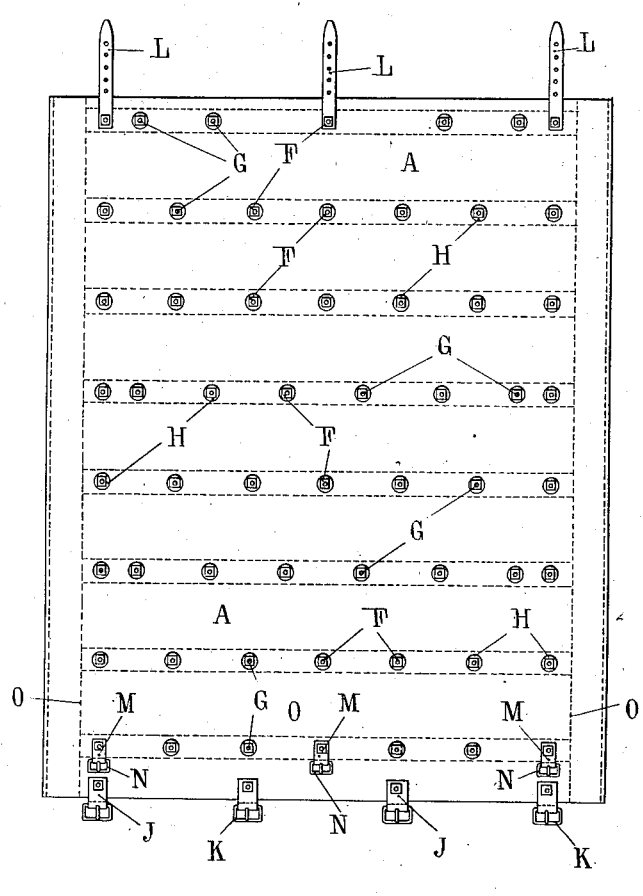
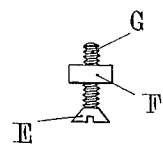
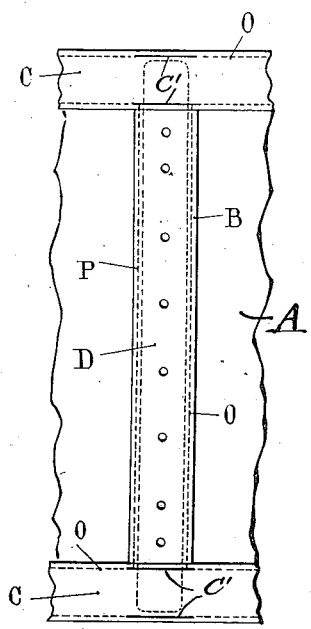
Witnesses:
W. K. Breen
J. H. Hall
Inventor:
Abraham B. J. R. Mirande
By Wm E Poulter
Attorney A. B. J. R. MIRANDE.
APRON FOR HARVESTING MACHINES.
APPLICATION FILED JUNE 7, 1913.

1,138,235.

Patented May 4, 1915.
2 SHEETS—SHEET 2.

UNITED STATES PATENT OFFICE.

ABRAHAM BERNARD JEAN RAOUL MIRANDE, OF SAVERDUN, FRANCE.

APRON FOR HARVESTING-MACHINES.

1,138,235.　　　　　Specification of Letters Patent.　　Patented May 4, 1915.

Application filed June 7, 1913. Serial No. 772,386.

*To all whom it may concern:*

Be it known that I, ABRAHAM BERNARD JEAN RAOUL MIRANDE, residing at Saverdun, Ariège, France, have invented certain new and useful Improvements in Aprons for Harvesting-Machines, of which the following is a specification, reference being had therein to the accompanying drawing.

The invention relates to improvements in aprons for harvesting machines.

The invention consists in the novel construction, arrangement and combination of parts as hereinafter fully described, illustrated in the drawings and pointed out in the appended claims.

In the drawing: Figure 1 is a plan view of the apron. Figs. 2 and 3 show details of construction. Fig. 4 is a plan view of the underside of the apron.

The improved apron comprises a sheet of fabric A to which are stitched leather bands B forming sheaths. The sheet is also provided with bands C of stitched leather forming borders and provided with slits C' at intervals for the introduction in the sheaths of flat steel bars D. The steel bars D assure the tension of the apron and are provided with holes for the passage of screws E with flat heads which are sunk in the sheaths B, the shanks G of the screws projecting through the apron for a certain distance and being retained by nuts F. The projecting shanks assist the conveyance of the straw or the like. Leather washers H are arranged between the nuts and the apron to prevent rusting. Leather girth straps I are arranged at equal distances on the apron connected to the second and third bars by the screws E (Fig. 4). The depending ends are provided with several holes and extend nearly to the edge of the apron. They serve for stretching the apron on the rollers of the machine. Corresponding buckle straps J provided with buckles K are arranged on the opposite end of the apron, as shown in Figs. 1 and 4. Small leather girth straps L provided with several holes are arranged at the extremity of the apron, fixed by screws and serve to completely close the apron when stretched by means of buckles N, Fig. 1. The dotted lines O—P represent the stitching.

What I claim is:

1. An apron for harvesting machines comprising a rectangular sheet of fabric provided with transverse bands of leather stitched along their edges so as to form sheaths, and with longitudinal leather bands forming borders, and flat steel bars inserted in said transverse sheaths.

2. An apron for harvesting machines comprising a rectangular sheet of fabric provided with transverse bands of leather stitched along their edges so as to form sheaths, and with longitudinal leather bands forming borders, and flat steel bars inserted in said transverse sheaths and connected to the same and to the fabric by screws and nuts, the heads of said screws being sunk in the leather sheaths and the shanks of the screws projecting on the outside of the apron to serve as draggers for the straw or the like.

In testimony whereof I affix my signature in presence of two witnesses.

ABRAHAM BERNARD JEAN RAOUL MIRANDE.

Witnesses:
　　H. R. EKCHNOF,
　　B. VETTES.